(12) United States Patent
Okamoto et al.

(10) Patent No.: US 6,729,526 B2
(45) Date of Patent: May 4, 2004

(54) FRICTION STIR WELDING APPARATUS AND METHOD AND PROCESSING APPARATUS AND METHOD

(75) Inventors: Kazutaka Okamoto, Hitachi (JP); Satoshi Hirano, Hitachi (JP); Masayuki Doi, Hitachinaka (JP); Hisanori Okamura, Tokai (JP); Masahisa Inagaki, Hitachi (JP); Tomio Odakura, Hitachi (JP); Masaru Tomobe, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/100,093

(22) Filed: Mar. 19, 2002

(65) Prior Publication Data

US 2003/0047584 A1 Mar. 13, 2003

(30) Foreign Application Priority Data

Sep. 12, 2001 (JP) ......................... 2001-276419

(51) Int. Cl.⁷ .......................... B23K 37/00; B23K 20/12; B23K 31/02
(52) U.S. Cl. ..................................... 228/2.1; 228/112.1
(58) Field of Search .............................. 228/2.1, 112.1, 228/114.5; 700/212, 147

(56) References Cited

U.S. PATENT DOCUMENTS

| | | | |
|---|---|---|---|
| 3,689,839 A | 9/1972 | Cother | |
| 4,778,313 A | 10/1988 | Lehmkuhl | |
| 4,926,709 A | 5/1990 | Gardner | |
| 5,697,544 A * | 12/1997 | Wykes | 156/580 |
| 5,713,507 A * | 2/1998 | Holt et al. | 228/112.1 |
| 5,744,927 A | 4/1998 | Hayashida | |
| 5,758,999 A | 6/1998 | Geise | |
| 5,867,280 A | 2/1999 | Seitz et al. | |
| 5,893,507 A * | 4/1999 | Ding et al. | 156/580 |
| 5,940,787 A | 8/1999 | Gelston | |
| 5,971,247 A * | 10/1999 | Gentry | 156/580 |
| 6,050,475 A * | 4/2000 | Kinton et al. | 144/142 |
| 6,102,636 A * | 8/2000 | Geise | 407/53 |
| 6,168,066 B1 * | 1/2001 | Arbegast | 228/102 |
| 6,299,050 B1 * | 10/2001 | Okamura et al. | 156/73.5 |
| 6,302,315 B1 * | 10/2001 | Thompson | 228/112.1 |
| 6,311,889 B1 | 11/2001 | Ezumi et al. | |
| 6,325,273 B1 * | 12/2001 | Boon et al. | 228/112.1 |
| 6,336,842 B1 | 1/2002 | Ootsuki et al. | |
| 6,421,578 B1 * | 7/2002 | Adams et al. | 228/112.1 |
| 6,497,355 B1 * | 12/2002 | Ding et al. | 228/2.1 |
| 2002/0027155 A1 * | 3/2002 | Okamura et al. | 228/112.1 |
| 2002/0050508 A1 * | 5/2002 | Yoshinaga | 228/112.1 |
| 2002/0145031 A1 * | 10/2002 | Hirano et al. | 228/112.1 |
| 2003/0047590 A1 * | 3/2003 | Okamoto et al. | 228/127 |
| 2003/0057261 A1 * | 3/2003 | Holman et al. | 228/112.1 |
| 2003/0141343 A1 * | 7/2003 | Murakami | 228/112.1 |

FOREIGN PATENT DOCUMENTS

EP 0496303 A1 * 7/1992

* cited by examiner

*Primary Examiner*—L. Edmondson
(74) *Attorney, Agent, or Firm*—Antonelli, Terry, Stout & Kraus, LLP

(57) ABSTRACT

The invention provides a friction stir welding apparatus and method and a processing apparatus and method, which are not easily affected by deformations of a work being processed. The friction stir welding apparatus inserts a rotating tool into the work and moves the rotating tool relative to the work to join members of the work. The friction stir welding apparatus and method and the processing apparatus and method of the invention, the latter cutting or grinding the work with a rotating cutter or grindstone, comprises controlling a relative distance between the tool, cutter or grindstone and the work under the joining or processing operation or an insertion depth so that the load factor or electric current of a spindle motor for rotating the tool, cutter or grindstone is within a predetermined range, and a controller therefor.

3 Claims, 9 Drawing Sheets

FRICTION STIR WELDING APPARATUS AND METHOD AND PROCESSING APPARATUS AND METHOD

BACKGROUND OF THE INVENTION

The present invention relates to a novel friction stir welding apparatus and method and a novel processing apparatus and method, both of which keep constant a relative distance between a tool, cutter or grindstone and a work to be welded or processed during friction stir welding, cutting or grinding.

The friction stir welding is a method that can join members of a work of such materials as aluminum and aluminum alloys (simply referred to as aluminum hereinafter), magnesium and magnesium alloys (simply referred to as magnesium hereinafter), copper and copper alloys (simply referred to as copper hereinafter), titanium and titanium alloys (simply referred to as titanium hereinafter), and iron or steel (simply referred to as iron hereinafter) in solid phase at temperatures below their melting points. More specifically, this is the method of inserting a tool, essentially harder than the work to be welded, into the work while rotating the tool, and moving the rotating tool relative to the work to utilize frictional heat generated between the tool and the work as well as a resulting plastic flow and join members of the work together. This method has been known by JP-07-505090A. That is, the method takes advantage of a plastic flow caused by frictional heat between the tool and the work and, unlike conventional welding such as arc welding and electron beam welding, does not melt the work during the process of welding.

Further, unlike the conventional friction welding method in which members to be processed are rotated against each other and joined together by frictional heat produced by the relative rotation, the friction stir welding method can continuously join the members of the work along a joint line longitudinally at a temperature below the melting point of the material. The joint line may be not only a straight line but also a curve or a three-dimensional curve.

FIG. 2 is a sectional view schematically showing a joining state in the friction stir welding. A hard tool 10 comprising a shoulder 11 and a pin 12 is rotated by a spindle motor not shown. A revolution speed, which depends on the material and shape of the work to be joined, is set at around 1,000 rpm. The tool 10 is then inserted into the work a predetermined depth from the surface 13 of the work and is moved relative to the work in a direction of joint 14. A speed of movement, which also depends on the material of the work to be joined, is about 500 mm/min. It is noted here that the tool 10 is tilted at a predetermined angle θ to the work toward the rear side with respect to the direction of movement. In the friction stir welding, the quality of joint is affected by the shape of the tool, the revolution speed, the speed of tool movement, and others. It is current practice that these factors are optimized based on user's knowhow. The most important one among the factors to be optimized is a distance or depth by which the tool 10 is inserted into the work.

FIG. 3 is a sectional view schematically showing a joining state in the friction stir welding when the distance for which the tool 10 is inserted into the work is set slightly deeper as compared with that of FIG. 2. The insertion depth of the tool 10 in the range between those of FIG. 2 and FIG. 3 results in a satisfactory joint quality. When the depth of insertion of the tool 10 into the work is set larger than that of FIG. 3, the shoulder 11 on the moving direction 14 side of the tool 10 sinks into the surface 13 of the work, thereby cutting the work with the side surface of the tool 10. In this case, the surface 13 of that portion of the work which has undergone the joining operation is recessed significantly from the remaining portion, and the material excessively cut off is discharged outside as burrs. Conversely, when the depth of insertion of the tool 10 into the work is set smaller than that of FIG. 2, the shoulder 11 on the side opposite the moving direction 14 of the tool 10 parts from the surface 13 of the work, reducing the effect of holding down the material stirred by the pin 12, with the result that the work is cut by the pin 12. The material of the work thus cut is discharged outside as burrs.

Hence, keeping the tool insertion depth into the work at an appropriate amount during the joining operation leads to an improvement of the quality of the joint. The insertion depth of the tool 10 into the work depends on a variety of factors, for example, a machining precision of the work, a method of holding the work and a precision of the joining apparatus itself. Establishing these factors within a precision of about 0.05 mm is very difficult to achieve with the current level of technology. Although a desired machining precision may be realized by investing a sufficient time and cost, this leads to an increase in the overall manufacturing cost and is practically difficult to realize.

To deal with such a problem, JP-11-226768A, for instance, shows a method of controlling the insertion depth of the tool 10 into the work to be joined, which uses a laser displacement meter. FIG. 4 is a sectional view showing an example construction of the joining apparatus. In this apparatus a table 27 is moved in the direction of X by a drive motor 21. On the table 27, a work 26 to be joined is securely held by a jig not shown. A machine head 25 is moved in the direction of Z by a head drive motor 22. The machine head 25 is supported by a ball thread 29 and a guide not shown. The machine head 25 has mounted thereon a tool 24 and a spindle motor 23 that drives the tool 24. The distance between the machine head 25 and the surface 30 of the work to be joined is measured by the laser displacement meter 28 mounted on the machine head 25. The distance measured is fed back and the head drive motor 22 is controlled to adjust the position of the machine head 25 so that the distance between the machine head 25 and the surface 30 of the work is kept at a predetermined value at all times.

The position control using such a laser displacement meter is a common measure also in the conventional arc welding and laser welding. It is common to perform the distance measurement by the laser displacement meter at a position offset to and slightly ahead of the tool. Thus, the distance between the machine head and the tool at the measuring position of the laser displacement meter may slightly differ from that measured near the tool. In the case of the friction stir welding, the work to be joined is acted upon by a force of about 1000 kgf from the tool. A problem therefore arises, for example, when a part of the work is slightly floated from the table. The laser displacement meter beforehand reads this flowing and controls the machine head to raise it upward according to the measurement. When the tool passes the floating position, the work is moved down by the force of the tool, increasing the distance between the tool and the work to slightly more than an appropriate distance. Further, it should be noted that the laser displacement meter is designed to detect the state of the surface (surface position). The meter thus tends to be subject to influences from, for instance, a change in radiation factor caused by smear of the surface of the work or by oxidation of the work due to frictional heat.

JP-06-143015A teaches, in a cutting machine that performs cutting while rotating a cutting tool by a main motor, adjusting a feed speed of the cutting tool to keep an electric current of the main motor at a predetermined value. But this reference does not show any particular relationship of the feed speed with the friction stir welding.

JP-11-188517A discloses that, in a cutting machine that performs cutting by rotating a cutting tool by a main motor, means is provided for stopping feed means according to an amount of load detected by the feed means. However, this reference is silent about any particular relationship of the feed means in the friction stir welding.

BRIEF SUMMARY OF THE INVENTION

An object of the present invention is to provide a friction stir welding apparatus and method and a processing apparatus and method, both of which are not easily affected by deformations of a work being processed.

The present invention features, in an aspect thereof, a friction stir welding apparatus which joins members of a work by inserting a rotating tool into the work and moving the rotating tool relative to the work, comprising a controller for controlling a relative distance in a tool insertion direction between the tool and the work during the joining operation or an insertion depth of the tool into the work so that a load or electric current of a spindle motor for rotating the tool is within a predetermined range.

The invention resides also in a friction stir welding method which features joining members of a work while controlling a relative distance in a tool insertion direction between the tool and the work during the joining operation or an insertion depth of the tool into the work so that a load or electric current of a spindle motor for rotating the tool is within a predetermined range.

The friction stir welding is a technique which is very simple in principle and can provide an excellent joint characteristic. This technique, however, requires controlling the relative distance between the tool and the work with a precision of about 0.05 mm at all times. This invention focuses on a heat balance in the friction stir welding. In the friction stir welding, a work done by the spindle motor in rotating the tool 10 constitutes a heat source.

FIG. 5 shows contact areas 31, 32 between the tool 10 and the work in the states of FIG. 2 and FIG. 3, respectively. As shown in FIG. 2 and FIG. 3, since the tool 10 is tilted at a predetermined angle θ to the work toward the rear side with respect to the moving direction, the contact areas 31, 32 depend on the depth of insertion of the tool 10 into the work. As described above, the work done by the spindle motor is transformed into frictional heat generated between the tool 10 and the work. When the revolution speed of the spindle motor is kept constant, the frictional heat generated depends on the contact area. The frictional heat diffuses into the work being processed. This heat raises the temperature of the work and thereby softens it, with the result that the work is stirred by the tool 10. When the contact area is large, the amount of frictional heat produced is large, and when the contact area is small, the amount of frictional heat is small. Therefore, to ensure a stable joining operation at all times requires stabilizing the stirring of the work by the tool 10. That is, the load or electric current of the spindle motor, which constitutes the work done by the spindle motor or the heat source, needs to be stabilized at all times.

FIG. 6 schematically shows a relationship between a tool insertion depth and a spindle motor load (=work done by the spindle motor). In the friction stir welding, the joint quality is influenced by the tool insertion depth, and an appropriate tool insertion depth lies in a certain range. If the revolution speed of the spindle motor is constant, there is an appropriate range of the spindle load corresponding to an appropriate value of the tool insertion depth.

The invention features, in another aspect, in a friction stir welding apparatus which joins members of a work by inserting a rotating tool into the work and moving the rotating tool relative to the work, controlling a relative distance between the tool and the work during the joining operation so that a load of the tool rotating spindle motor is within a predetermined range. The relative distance between the tool and the work may be set by using the head drive motor 22 of FIG. 4, for example. The load of the spindle motor may be electrically detected, for example, from the spindle motor 23 of FIG. 4, and it is preferable to perform the detection by using an electric current.

A laser displacement meter or contact type displacement meter that has conventionally been used may also be used additionally to detect the relative distance between the tool and the work or the amount of insertion of the tool into the work during the joining operation. The load of the spindle motor depends on a temperature of the members of the work immediately before being joined together. For a work made of aluminum or copper which has a good heat conductivity, for example, if the joining speed is significantly low, the frictional heat generated between the tool and the work may be diffused, though very rarely, forward in the direction of tool advancement. When a temperature rise of the work in front of the tool caused by the diffused heat is more than about 50° C., the strength of the work in front of the tool (for example, resistance to deformation at that temperature) deteriorates. Thus, if a work done by the spindle motor is constant, an excessive work is produced considering preheating due to the heat diffusion. Therefore, a laser displacement meter may be used as an auxiliary means. If the work to be processed has a shape consisting of an arbitrary curved surface, a line normal to an arbitrary curved surface may be detected by using the laser displacement meter.

The invention further features, in another aspect, in a friction stir welding method of joining members of a work by inserting a rotating tool into the work and moving the rotating tool relative to the work, comprising the steps of rotating the tool at a constant speed while inserting the rotating tool into the work at a constant insertion speed, when a predetermined load ratio or factor of a spindle motor relative to a maximum output for rotation of the tool or a predetermined insertion depth of the tool into the work is reached, holding the rotating tool where it is for a predetermined duration, then moving the rotating tool in a joining direction at a constant joining speed to perform joining, and at the same time with the tool movement, controlling a relative distance in a tool insertion direction between the tool and the work during the joining operation or an insertion depth of the tool into the work so that a load factor or electric current of the spindle motor for rotating the tool is within a predetermined range.

The invention features, in still another aspect, in a friction stir welding apparatus which joins members of a work by inserting a rotating tool, rotated by a spindle motor, into the work and moving the rotating tool relative to the work, comprising revolution speed setting means for setting a revolution speed of the tool, insertion speed setting means for setting a constant insertion speed at which the tool rotating at a constant revolution speed is inserted into the work, load factor setting means for setting a load factor of the spindle motor relative to a maximum tool rotation output or an insertion depth setting means for setting an insertion depth into the work, hold time setting means for setting a hold time during which the tool is held where it is when the load factor or insertion depth reaches the set value, joining speed setting means for setting a constant joining speed at which the tool is moved in a joining direction to join the members of the work, and a controller for controlling a relative distance in a tool insertion direction between the tool and the work during the joining operation or an insertion depth of the tool into the work so that a load factor or electric current of the spindle motor for rotating the tool is within a predetermined range.

The invention features, in still another aspect, in a processing apparatus or method which cuts or grinds a work by moving a rotating cutter or grindstone relative to the work, comprising a controller for controlling a relative distance in a cutter or grindstone insertion direction between the cutter or grindstone and the work during the processing operation or an insertion depth of the cutter or grindstone into the work so that a load factor or electric current of a spindle motor for rotating the cutter or grindstone is within a predetermined range.

Further, the invention can also be applied similarly to a processing apparatus which cuts or grinds a work by inserting a rotating cutter or grindstone, rotated by a spindle motor, into a work by a head drive unit and moving the cutter or grindstone relative to the work.

The invention further features, in a further aspect, in a processing apparatus which cuts or grinds a work by inserting a rotating cutter or grindstone, rotated by a spindle motor, into a work by a head drive unit and moving the cutter or grindstone relative to the work, comprising revolution speed setting means for setting a revolution speed of the cutter or grindstone, insertion speed setting means for setting a constant insertion speed at which the cutter or grindstone rotating at a constant revolution speed is inserted into the work, load factor setting means for setting a load factor of the spindle motor relative to a maximum cutter or grindstone rotation output or an insertion depth setting means for setting an insertion depth into the work, processing speed setting means for setting a constant processing speed at which the cutter or grindstone is moved in a processing direction to process the work, and a controller for controlling a relative distance in a cutter or grindstone insertion direction between the cutter or grindstone and the work during the processing operation or an insertion depth of the cutter or grindstone into the work so that a load factor or electric current of the spindle motor for rotating the cutter or grindstone is within a predetermined range.

The invention features in a further aspect, in a processing method which cuts or grinds a work by moving a rotating cutter or grindstone relative to the work, comprising the step of controlling a relative distance in a cutter or grindstone insertion direction between the cutter or grindstone and the work during the processing operation or an insertion depth of the cutter or grindstone into the work so that a load of a spindle motor for rotating the cutter or grindstone is within a predetermined range.

The invention features, in a further aspect, in a processing method which cuts or grinds a work by moving a rotating cutter or grindstone relative to the work, comprising the steps of inserting the cutter or grindstone rotating at a constant revolution speed into the work at a constant insertion speed, after a predetermined load factor of a spindle motor relative to a maximum cutter or grindstone rotation output or a predetermined insertion depth into the work is reached, moving the cutter or grindstone in a processing direction to process the work, and at the same time with the movement, controlling a relative distance in a cutter or grindstone insertion direction between the cutter or grindstone and the work during the processing operation or an insertion depth of the cutter or grindstone into the work so that a load factor or electric current of the spindle motor for rotating the cutter or grindstone is within a predetermined range.

Other objects, features and advantages of the invention will become apparent from the following description of the embodiments of the invention taken in conjunction with the accompanying drawings.

DETAILED DESCRIPTION OF THE INVENTION (Embodiment 1)

Figure 1:
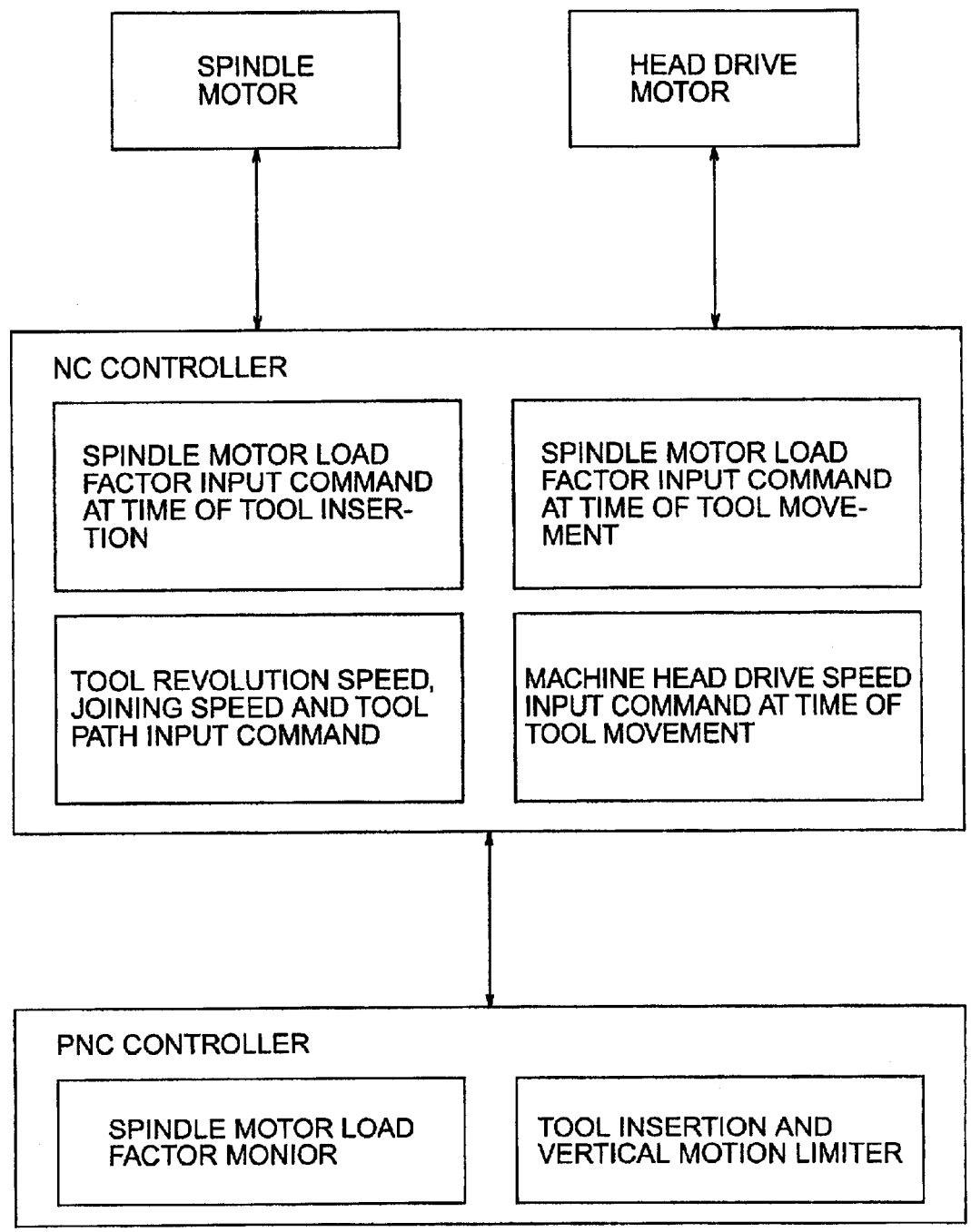
FIG. 1 is a block diagram showing the concept of a controller for the friction stir welding apparatus of the invention.
Figure 2:
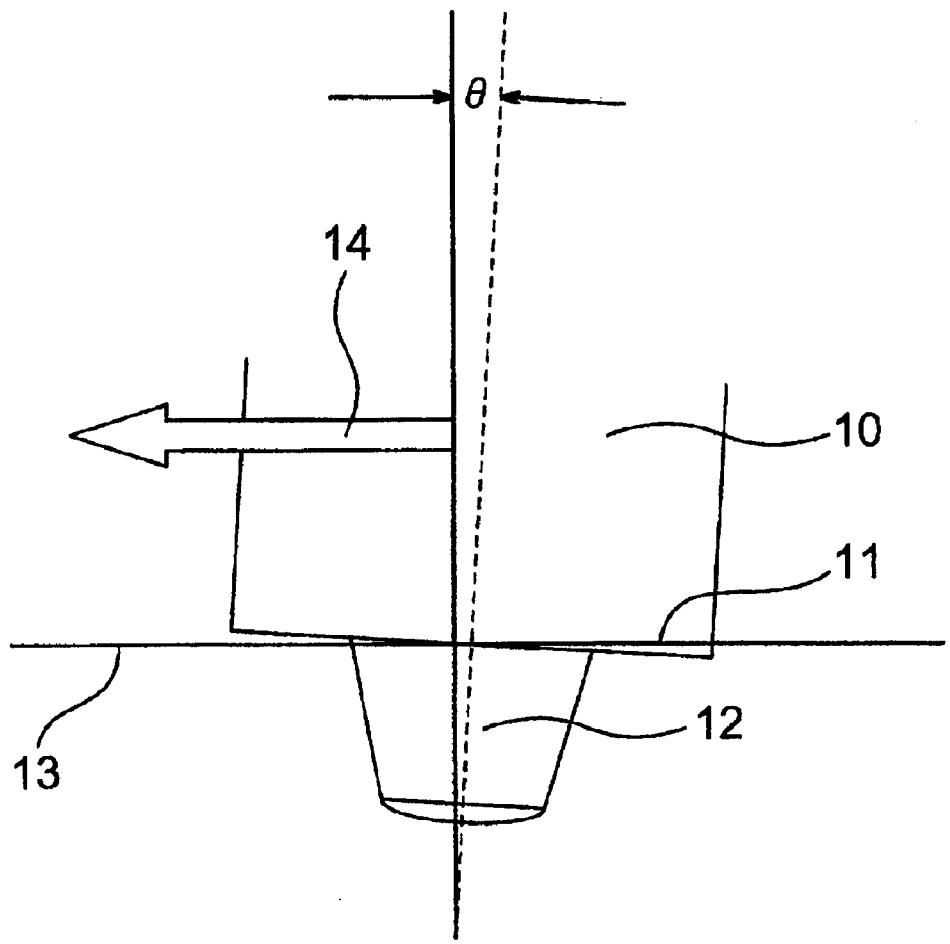
FIG. 2 is an enlarged section view showing the detail of a tool in the friction stir welding.
Figure 3:
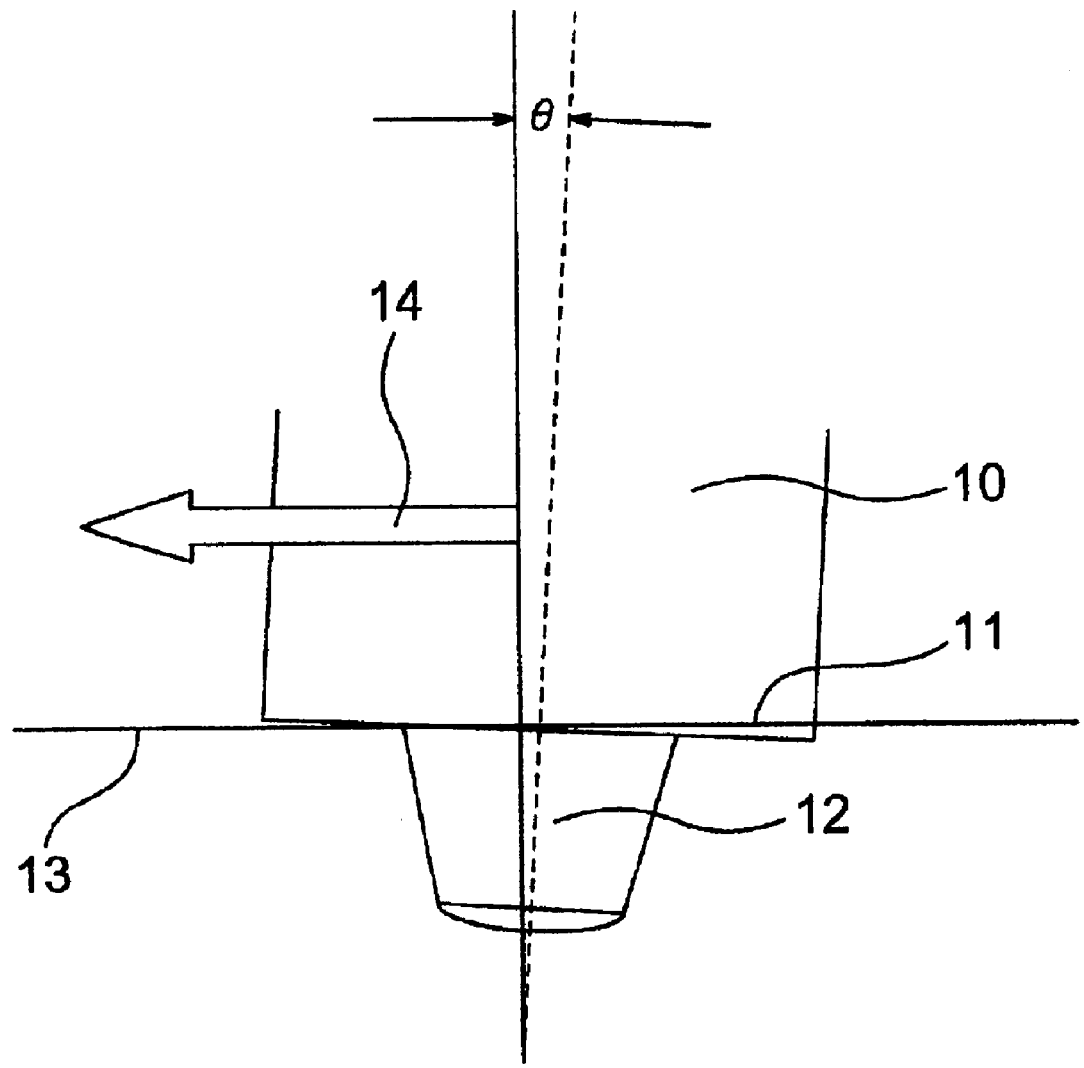
FIG. 3 is an enlarged section view showing the detail of a tool in the friction stir welding.
Figure 4:
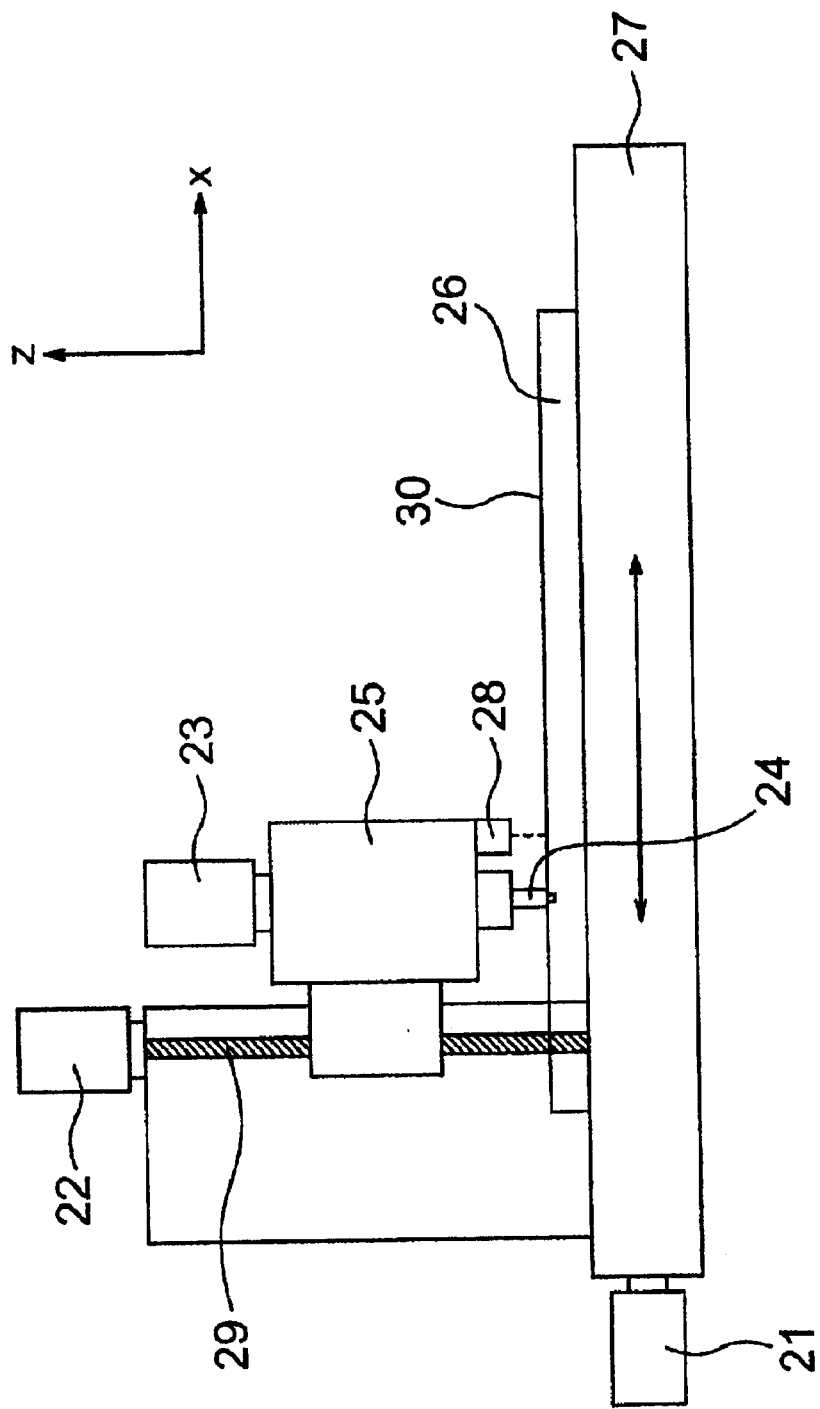
FIG. 4 is a sectional view of the friction stir welding apparatus in which a control on the tool insertion depth is additionally made by using a laser displacement meter.
Figure 5:
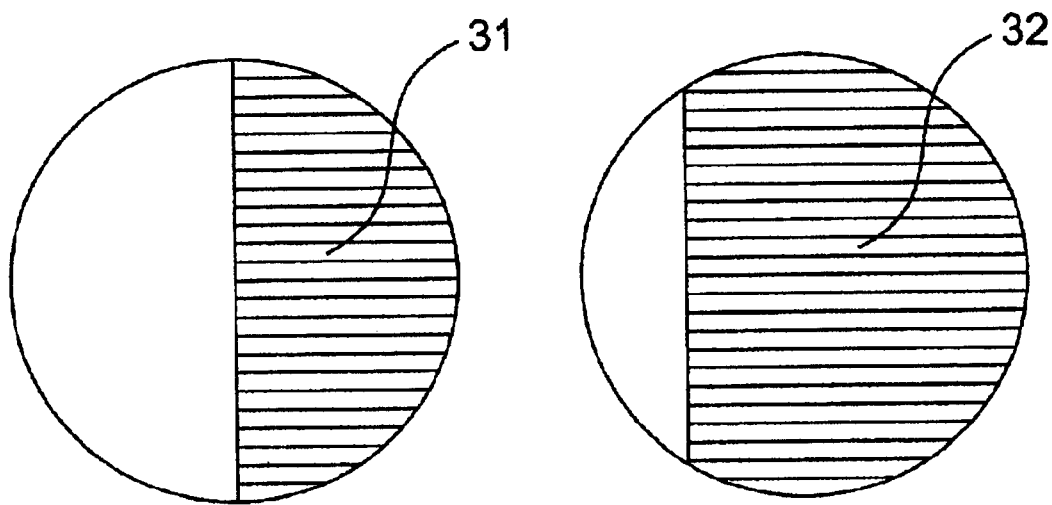
FIG. 5 is a plan view showing contact areas between the tool and members of the work to be joined in the case of FIG. 2 and FIG. 3.
Figure 6:
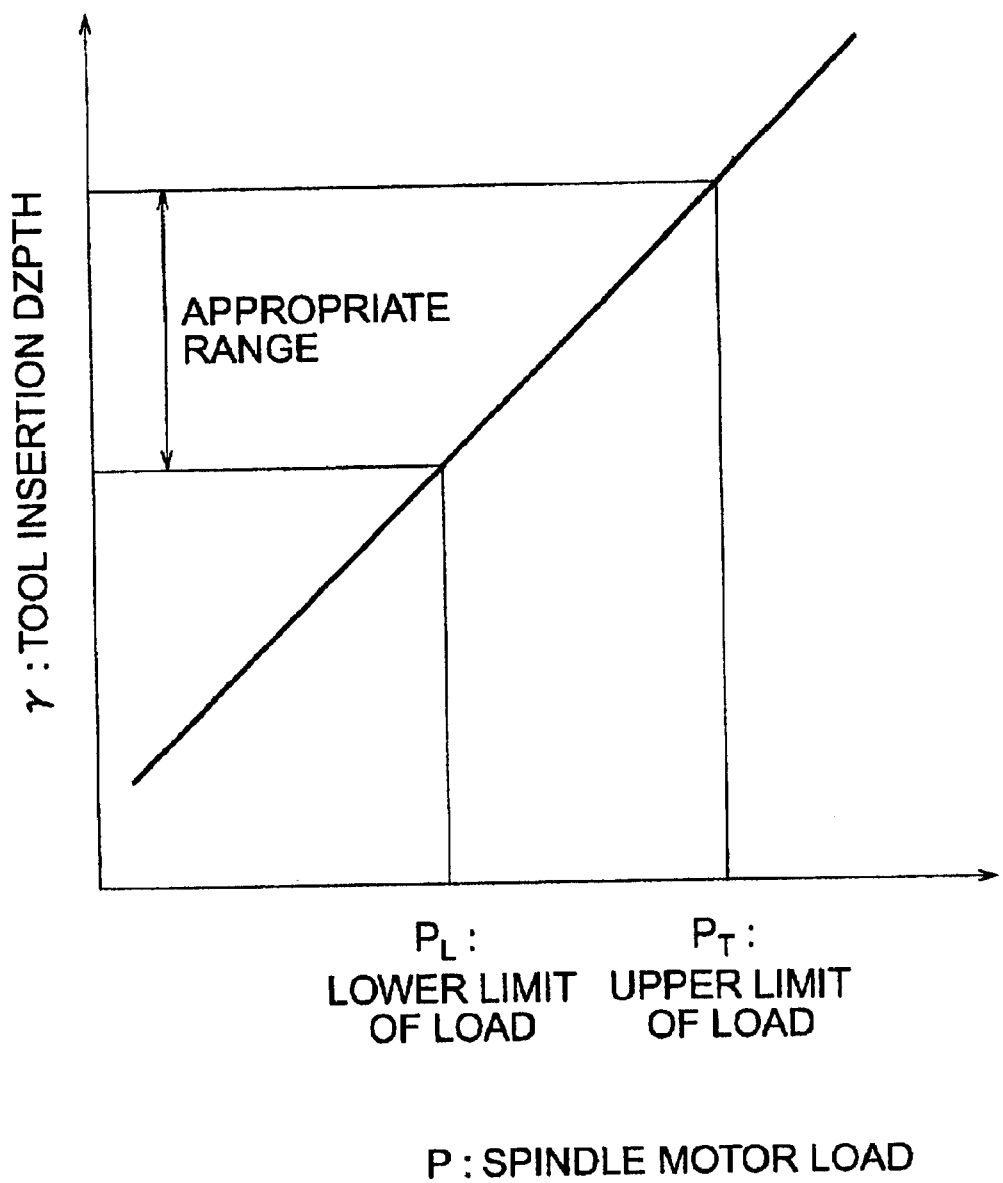
FIG. 6 is a diagram showing a basic concept of the invention, i.e., a relation between the tool insertion depth and the spindle motor load.
Figure 7:
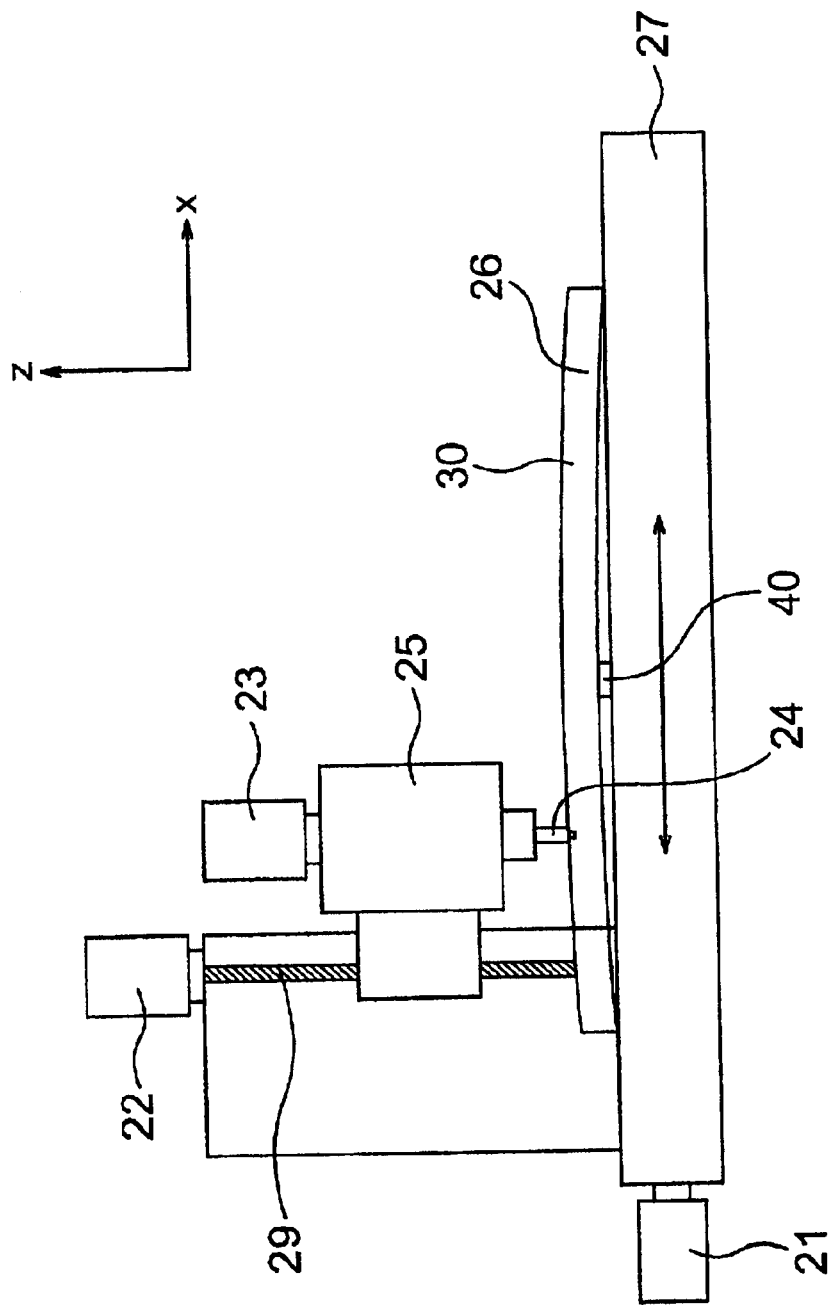
FIG. 7 is a sectional view of the friction stir welding apparatus of the invention.

FIG. 1 is a block diagram of the friction stir welding apparatus showing the concept of a relative position control on a tool and a work according to the invention. FIG. 7 is a cross section of the friction stir welding apparatus with the controller of FIG. 1. In FIG. 1, an NC controller sets a spindle motor for rotating the tool and a head drive motor for inserting the tool into the work to predetermined load factors, and with the input of a revolution speed of the tool and a joining speed, joining is performed automatically. A programmable controller (PMC) monitors the load factor of the spindle motor and performs a feedback control on the tool insertion depth.

That is, the NC controller and the PMC controller have revolution speed setting means for setting a revolution speed of the tool, insertion speed setting means for setting a constant speed at which the tool is inserted into the work while the tool is rotated at a constant speed, load factor setting means for setting a load factor of the spindle motor relative to the maximum tool rotation output or an insertion depth setting means for setting an insertion depth into the work, hold time setting means for setting a time duration for which the tool is held when the load factor or insertion depth reaches the preset value, and joining speed setting means for setting a joining speed at which the tool is moved in the joining direction to join members of the work. Further, these controllers control the relative distance in the tool insertion direction between the tool and the work during the joining operation or the insertion depth of the tool into the work so that the load factor or electric current of the spindle motor falls in a predetermined range.

FIG. 7 shows an apparatus of a type that is controlled by the controller of FIG. 1 and moves the table 27 left and right by the table drive motor 21 to form a linear joint in the X-axis direction. The work 26 is held on the table 27 by a jig not shown. The work 26 comprises two members made of aluminum, each measuring 2000 mm long by 150 mm wide by 5 mm thick, and these two members are placed in contact side by side in a direction perpendicular to the plane of the sheet. An iron plate 40 2 mm thick is interposed at the center between the two members of the work to verify the function of this invention. As a result, the work 26 to be joined rises about 2 mm at almost the central portion with respect to the longitudinal direction.

The tool 24 is made from tool steel and has a shoulder diameter of 13 mm, a pin diameter of 6 mm and a pin length of 4.0 mm. The spindle motor 23 for rotating the tool 24 has an output of 5 kW. The machine head 25 mounting the tool 24 and the spindle motor 23 is supported by the ball thread 29 and moved in the Z direction by a head drive motor 27. These motors are controlled by the NC controller and the PMC controller not shown.

Figure 8:
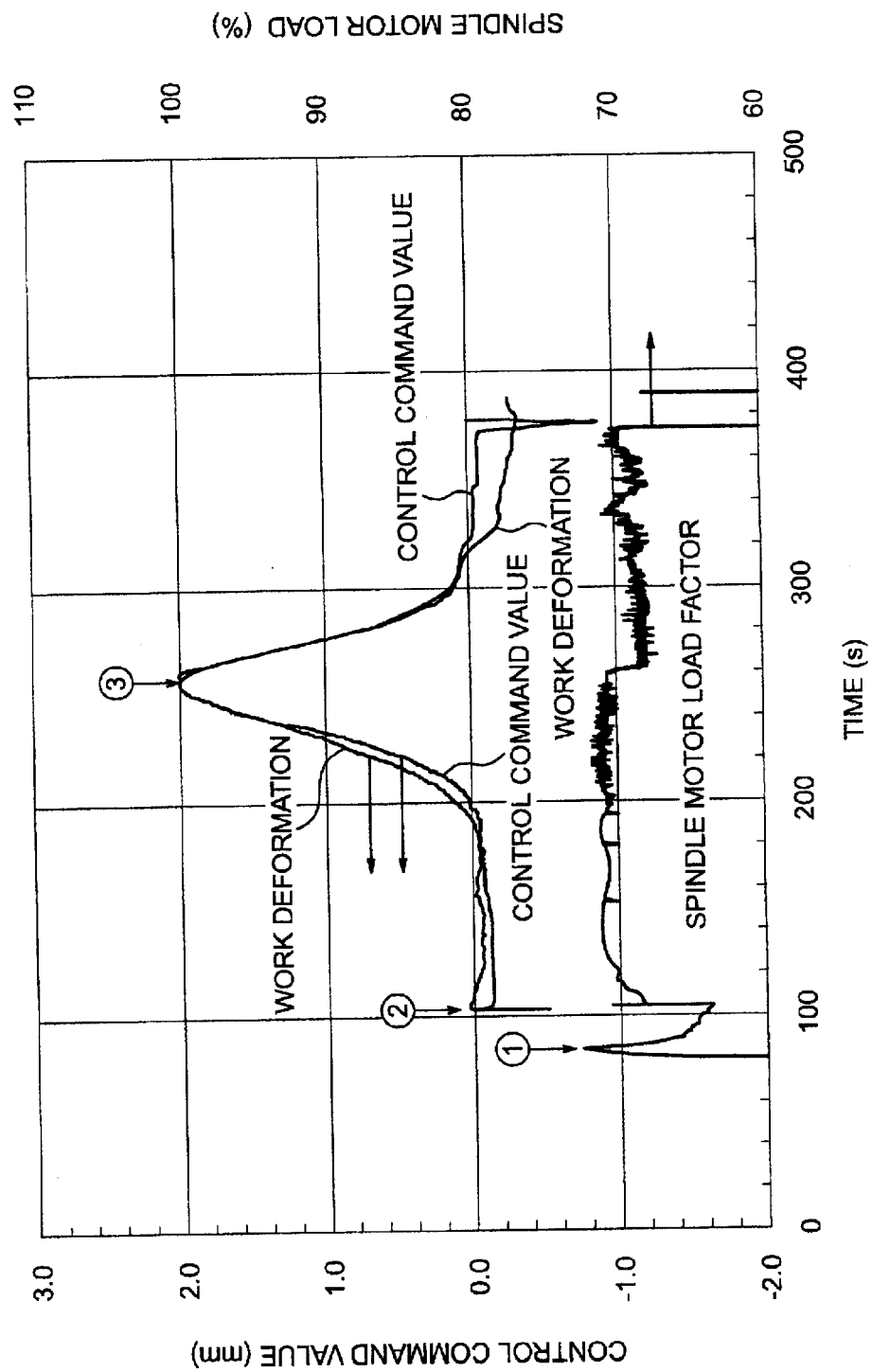
FIG. 8 is a diagram showing changes over time of a control command value, a work deformation and a spindle motor load factor in the friction stir welding apparatus of the invention.

FIG. 8 shows changes over time of a spindle motor load ratio or factor and a distance traveled by the machine head during operation. First, the tool 24 is rested 5 mm above the surface 30 of the work 26. The spindle motor 23 is operated at 1000 rpm and the head drive motor 22 is also started to lower the machine head 25 at the rate of 5 mm/min. The lowering of the machine head 25 is controlled so as to stop the lowering of the tool 24 when the distance traveled by the machine head 25 reaches 9.6 mm (=5.0+4.6 mm) or the load factor of the spindle motor 23 (percentage of the current output with respect to the maximum output) is 73%.

At time (1) of FIG. 8, the spindle motor load factor was 73% and the machine head 25 was stopped. The position of the machine head 25 in this state was taken as a reference of a control command value (=0 mm). The tool 24 was held there for 20 seconds while rotating at a constant speed. At this time, the spindle motor load factor slightly decreased but was not reflected on the control. After the tool was held for 20 seconds, the table drive motor 21 was started to move the work 26 relative to the tool 24 in the joining direction of X ((2) of FIG. 8). The table moving speed at this time was 400 mm/min. At the same time when starting the movement in the X direction, the machine head 25 was controlled vertically by the head drive motor 22 so that the load factor of the spindle motor 23 would be 68–71%. When the spindle motor load factor steps out of the band described above, the machine head 25 has to be moved up or down at the speed of 6 mm/min. An almost central portion of the work 26 rises up about 2 mm. This concave configuration of the work 26 is also shown in FIG. 8.

At time (3) of FIG. 8, the process reaches the apex of the convex of the work. FIG. 8 clearly shows that the distance traveled by the machine head (control command value) perfectly follows the shape (deformation) of the work. The joining conditions and control parameters described above are input through the NC controller, and a human interface is required only for input of the parameters into the NC device.

Figure 9:
FIG. 9 is an external view of members joined together by the friction stir welding of the invention.

FIG. 9 compares an external view of a joint bead obtained by performing the tool insertion depth control described above and an external view of a joint bead obtained with no tool insertion depth control and by keeping the machine head 25 at the same position. The position of the apex of the convex as shown in FIG. 8 is indicated by the same reference numeral (3). As shown in FIG. 9, when the control is performed, the bead quality is stable, and on the other hand, when the control is not performed, the tool cuts into the work significantly at around (3), producing a substantial amount of burrs, as seen in the lower part of FIG. 9.

As described above, it is clear that performing the control on the relative distance between the tool and the work or on the tool insertion depth of the invention can produce an improved joint quality with no burrs and little depression. The invention can be implemented basically with a relatively simple apparatus by adding software to the existing NC controller.

(Embodiment 2)

The processing apparatus of this embodiment is used on a precision processing apparatus such as a surface polisher, in which the invention is applied in place of the tool of the Embodiment 1, and performs rotation of a grindstone, its insertion into the work being polished and its movement in the processing direction in a way similar to the Embodiment 1. Further, the processing apparatus has a head drive device with a controller for controlling a relative distance between the grindstone and the work being polished or an insertion depth of the grindstone into the work so that the load factor or electric current of a spindle motor falls in a preset range, as in the Embodiment 1.

More specifically, the processing apparatus with the controller includes revolution speed setting means for setting a revolution speed of a grindstone, insertion speed setting means for setting a constant speed at which the grindstone is inserted into the work while the grindstone is rotated at a constant speed, load factor setting means for setting a load factor of the spindle motor relative to the maximum grindstone rotation output or an insertion depth setting means for setting an insertion depth into the work, processing speed setting means for setting a processing speed at which the grindstone is moved in the processing direction to process the work, and the controller for controlling the relative distance in the grindstone insertion direction between the grindstone and the work during operation or the insertion depth of the grindstone into the work so that the load factor or electric current of the spindle motor falls in a predetermined range.

With this construction, it is possible to keep the load factor or electric current of the spindle motor for the grindstone within a preset range at all times, thus allowing apparently smooth polishing. This embodiment is particularly advantageous for application to a mirror surface polisher with a curved surface.

According to the invention, the tool insertion depth into the work, the most important factor in the joint quality management of the friction stir welding, can be kept constant at all times, achieving significant advantages of enabling a high precision control and automation of the joining apparatus.

It will be further understood by those skilled in the art that the foregoing description has been made on the embodiments of the invention and that various changes and modifications may be made in the invention without departing from the sprit of the invention and the scope of the appended claims.

What is claimed is:

1. A friction stir welding apparatus for joining members of a work by inserting a rotating tool rotated by a spindle motor into the work and moving the rotating tool relative to the work, comprising:

revolution speed setting means for setting a revolution speed of the tool;

insertion speed setting means for setting a constant insertion speed at which the tool rotating at a constant revolution speed is inserted into the work;

load factor setting means for setting a load factor of the spindle motor relative to a maximum tool rotation output or an insertion depth setting means for setting an insertion depth into the work;

hold time setting means for setting a hold time during which the tool is held where it is when the load factor or insertion depth reaches the set value;

joining speed setting means for setting a constant joining speed at which the tool is moved in a joining direction to join the members of the work; and a controller for controlling a relative distance in a tool insertion direction between the tool and the work or an insertion depth of the tool into the work so that a load factor or electric current of the spindle motor for rotating the tool is within a predetermined range.

2. A friction stir welding apparatus according to claim 1, further comprising a laser displacement meter or a contact type displacement meter for detecting the relative distance in a tool insertion direction between the tool and the work during the joining operation or the insertion depth of the tool into the work, the detected values being reflected on the controller.

3. A friction stir welding method of joining members of a work by inserting a rotating tool into the work and moving the rotating tool relative to the work, comprising the steps of:

inserting the rotating tool into the work at a constant insertion speed;

when a predetermined load factor of a spindle motor relative to a maximum tool rotation output or a predetermined insertion depth of the tool into the work is reached, holding the rotating tool where it is for a predetermined duration;

then moving the rotating tool in a joining direction at a constant joining speed; and at the same time controlling a relative distance in a tool insertion direction between the tool and the work during the joining operation or an insertion depth of the tool into the work so that a load factor or electric current of the spindle motor for rotating the tool is within a predetermined range.

* * * * *